United States Patent
Fleming et al.

[11] 3,829,578
[45] Aug. 13, 1974

[54] ANTIVIRAL COMPOSITIONS CONTAINING BIS-BASIC ETHERS AND THIOETHERS OF XANTHENE AND XANTHEN-9-ONES AND METHODS OF TREATING VIRUSES THEREWITH

[75] Inventors: Robert W. Fleming, Ann Arbor, Mich.; Albert A. Carr, Cincinnati, Ohio

[73] Assignee: Richardson-Merrell Inc., New York, N.Y.

[22] Filed: Nov. 2, 1972

[21] Appl. No.: 303,255

Related U.S. Application Data
[63] Continuation of Ser. No. 96,976, Dec. 10, 1970, abandoned.

[52] U.S. Cl.............. 424/283, 424/248, 424/250, 424/267, 424/274
[51] Int. Cl............................................ A61k 27/00
[58] Field of Search................................. 424/283

*Primary Examiner*—Richard L. Hutt
*Attorney, Agent, or Firm*—George W. Rauchfuss, Jr.; Eugene O. Retter

[57] ABSTRACT

Antiviral compositions and methods of inhibiting or inactivating viruses by administering to hosts an antivirally effective quantity of an active ingredient are disclosed herein. The active ingredients are those compounds having the formula

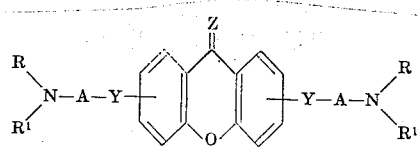

wherein Z is oxygen or $H_2$; each Y is oxygen or divalent sulfur; each A is a straight or branched alkylene chain of from two to four carbon atoms and which separates the amino nitrogen and Y by at least two carbon atoms; each R and $R^1$ are individually selected from hydrogen, lower alkyl of from 1 to 4 carbon atoms, alkenyl of from three to six carbon atoms and having the vinyl unsaturation in other than the 1-position of the alkenyl group; or each set of R and $R^1$ taken together with the nitrogen atom to which they are attached is a saturated monocyclic heterocyclic group such as pyrrolidino, piperidino, morpholino or N-(lower)-alkylpiperazino; or pharmaceutically acceptable acid addition salts of said compounds.

7 Claims, No Drawings

ANTIVIRAL COMPOSITIONS CONTAINING BIS-BASIC ETHERS AND THIOETHERS OF XANTHENE AND XANTHEN-9-ONES AND METHODS OF TREATING VIRUSES THEREWITH

RELATIONSHIP TO OTHER APPLICATIONS

This application is a continuation of our copending application Ser. No. 96,976 filed Dec. 10, 1970 and now abandoned.

FIELD OF INVENTION

This invention relates to compositions which have antiviral activity and to the use of such compositions for inhibiting or inactivating viruses by subjecting a host or a host and a virus susceptible to replication inhibition to an antivirally effective quantity of such compositions.

SUMMARY OF INVENTION

It has now been found that compounds having the formula

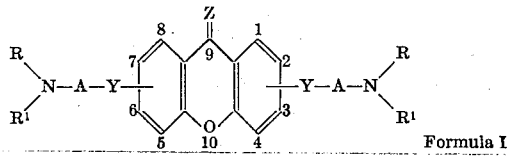

Formula I wherein Z is oxygen or $H_2$; each Y is oxygen or divalent sulfur; and each A is a straight or branched alkylene chain of from two to four carbon atoms and which separates the amino nitrogen and Y by at least two carbon atoms; R and $R^1$ are individually hydrogen, lower alkyl of from one to four carbon atoms, alkenyl of from three to six carbon atoms and having the vinyl unsaturation in other than the 1-position of the alkenyl group; or each set of R and $R^1$ taken together with the nitrogen atom to which they are attached is a saturated monocyclic heterocyclic group such as pyrrolidino, piperidino, morpholino, piperazino or N-(lower)alkylpiperazino or pharmaceutically acceptable acid addition salts thereof are effective for inactivating or inhibiting a broad variety of viruses.

DETAILED DESCRIPTION OF INVENTION

Each basic ether group, that is, the radical

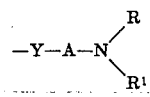

of Formula I, can be linked to one of the benzenoid rings of the tricyclic ring system of the xanthene or xanthenone by replacement of any of the four hydrogen atoms of the benzenoid ring to which such radical is attached. Thus, one of the groups can be in any of the positions 1 through 4 of the tricyclic ring system, and the other can be in any of the positions 5 through 8. Preferably, one of the basic ether radicals is in the 2- or 3-position and the other is in the 6- or 7-position of the tricyclic ring system.

Each of the symbols A in the compounds of the above Formulae is an alkylene radical having from two to four carbon atoms which can be a straight chain, that is, for example, $-CH_2-(CH_2)_s-$ wherein s is a whole integer of from 1 to 3 or a branched chain. Each of the alkylene groups as represented by A can be the same or different. Preferably these groups are the same. Illustrative of alkylene groups as represented by A there can be mentioned, for example: 1,2-ethylene, 1,3-propylene and 1,4-butylene and the like.

Each amino group of the compounds of Formula I, that is,

can be a primary, a secondary or a tertiary amino group. Each R and $R^1$ is individually hydrogen, lower alkyl having from 1 to about 4 carbon atoms, alkenyl of from three to six carbon atoms and having the vinyl unsaturation in other than the 1-position of the alkenyl group. Preferably each of the amino groups as represented by

is a tertiary amino group.

The term lower alkyl as used in reference to the compounds of Formula I relates to straight or branched alkyl chains having from one to four carbon atoms. Illustrative of lower alkyls as can be represented by each R or $R^1$ in the compounds of Formula I there can be mentioned, for example: methyl, ethyl, n-propyl, isopropyl, n-butyl, isobutyl, secondary-butyl, and the like.

When R or $R^1$ in the compounds of Formula II represents an alkenyl group, the vinyl unsaturation is in a position other than the 1-position of said alkenyl group. Illustrative of alkenyl groups as represented by R and $R^1$ there can be mentioned, for example: allyl, 3-butenyl, 4-hexenyl and the like.

Illustrative of heterocyclic groups as represented by each

there can be mentioned, for example: piperidino, pyrrolidino, morpholino, piperazino, N-ethylpiperazino, N-methylpiperazino and the like.

Pharmaceutically acceptable acid addition salts of the base compounds of this invention are those of any suitable inorganic or organic acids. Suitable inorganic acids are, for example, mineral acids, such as hydrochloric, hydrobromic, sulfuric or phosphoric acids and the like. Suitable organic acids are, for example, carboxylic acids such as, acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicylic, 2-phenoxybenzoic and the like, or sulfonic acids such as, methane sulfonic, 2-hydroxyethane sulfonic acid and the like. Mono- or di-acid salts may be formed, although in practice, the bis-basic salts are usually isolated. Also, the salts can be hydrated or substantially anhydrous.

Illustrative of antivirally effective compounds as represented by Formula I there can be mentioned, for example: 3,6-bis[2-(diethylamino)ethoxy]xanthen-9-one, 3,6-bis[2-dimethylamino)ethoxy]xanthen-9-one, 3,6-bis[3-(dimethylamino)-propoxy]xanthen-9-one, 3,6-bis(2-morpholinoethoxy)xanthen-9-one, 3,-6-bis(2-piperidinoethoxy)xanthen-9-one, 3,6-bis(2-pyrrolidinoethoxy)xanthen-9-one, 3,6-bis[2-(N-methylpiperazino)-ethoxy]xanthen-9-one, 3,6-bis(2-piperazinoethoxy)xanthen-9-one, 3,6-bis[2-(diisopropylamino)ethoxy]xanthen-9-one, 3,6-bis[2-(diethylamino)ethylthio]xanthen-9-one, 2,7-bis[2-dimethylamino)ethoxy]xanthene, 2,7-bis[2-(diallylamino)ethoxy]xanthene and the like.

The method used to prepare the active compounds of this invention is illustrated by the following reaction

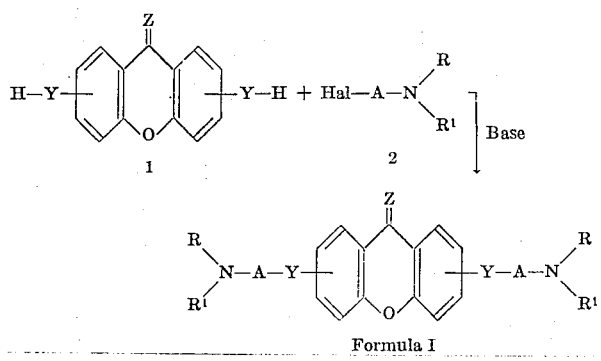

Formula I

In this reaction, Z, Y, A, R and $R^1$ have the meanings defined hereinbefore and each Hal is chlorine, bromine or iodine.

The preferred base for this reaction is sodium methoxide, however, other bases such as sodium hydride, sodium amide, sodium hydroxide, potassium hydroxide and the like may be used. Solvents used as the reaction medium may vary over a wide range of solvent types and include aromatic hydrocarbons such as benzene, toluene, xylene and the like; halogenated aromatics, such as chlorobenzene and the like; aprotic solvents such as N,Ndimethylformamide, N,N-dimethylacetamide, dimethyl sulfoxide and the like; alcohols such as ethanol, isopropanol and the like; ketones such as acetone, butanone and the like; ethers such as tetrahydrofuran, dioxane and the like; water; or mixtures of solvents. The preferred solvent is chlorobenzene.

In the method of synthesis when either sodium methoxide, sodium amide or sodium hydride, for example, is used as the base, the reaction is carried out in an anhydrous medium, such as anhydrous toluene, chlorobenzene and the like. About 2.5 equivalents of the base is added to a suspension of 1 equivalent of compound 1 wherein Y is oxygen or sulfur in the anhydrous solvent, and the mixture heated to form the diphenoxide or dithiophenoxide. In this case where sodium methoxide is used, added methanol and the methanol formed in the reaction may be removed advantageously by azeotropic distillation. About 2.5 equivalents of the haloalkylamine, 2, is then added and the mixture heated to reflux for a period which may vary from about 4 to 24 hours. The product, 3, is then isolated by customary procedures, such as, for example, by filtration, precipitation, recrystallization and the like.

The dihydroxyxanthen-9-one derivatives, that is, compound I wherein Z and Y are oxygen can be made by generally known procedures. For example, 2,2',4,4'-tetrahydroxybenzophenone is heated in an autoclave in aqueous solution to give 3,6-dihydroxyxanthen-9-one, M.P. >300°C. (P. Grover et al., J. Chem. Soc. 1953, 3982). Compound 1 wherein Z is $H_2$, Y is oxygen and the position of substitution of the —YH groups is 2,7— may be prepared by the diacetylation of xanthene followed by rearrangement through a Baeyer-Villiger reaction to the corresponding diacetoxyxanthene which is subsequently hydrolyzed under basic conditions to give the desired 2,7-dihydroxyxanthene, M.P. 220°–224°C. Compound 1 where Y is a divalent sulfur atom may be prepared by the thermal rearrangement of the bis-dialkylthiocarbamates of the corresponding diol derivative followed by alkaline hydrolysis of the rearranged products according to the method of Newman and Karnes for the conversion of phenols to thiophenols [M. S. Newman and H. A. Karnes, J. Org. Chem. 31, 3980 (1966)].

It has been found that the compounds of this invention are effective for inactivating or inhibiting a broad variety of viruses and can thus be employed as antiviral agents. These compounds are effective for preventing or inhibiting characteristic viral disease symptoms in a host by a wide variety of methods of application and composition. They can be administered for an antiviral effect by means which subject the host, or such host and a virus, to the active ingredients. The host is subjected to the active ingredients by bringing together an active ingredient and host, for example, by applying or contacting the host with such active ingredient or simply administering the active ingredient to the host. This includes subjecting the host to such active ingredient prior to infection with a virus, that is, prophylactic use, as well as subjecting the host to such active ingredient after infection, that is, therapeutic use. Thus, in viable biological material hosts subjected to the active ingredients, the replication of viruses is inhibited when the host is infected before or after being subjected to such ingredients. Also, administration by various routes of the active ingredients to an animal host prior to or after infection with the virus prevents or inhibits viral replication and the development of the various disease conditions characteristic of the particular virus. By the term "infection" we simply mean invasion of the host with a pathogenic virus. By the term "host" we mean viable biological material or intact animals which are capable of inducing the formation of interferon and which can support the replication of a virus. Preferably the host is of animal and particularly warm blooded or mammalian origin. Illustrative of hosts for various viruses there can be mentioned: viable biological material such as can be used in the production of vaccines, for example, tissue cultures such as that of kidney, lung, amnion cells, embryos, for example, chick allantoic fluid; and various animals, for example, warm blooded animals such as birds or mammals, including mice, rats, guinea pigs, gerbils, ferrets and the like.

The mode of activity of the active ingredients is not rigorously defined. Inter alia, the active ingredients induce the formation of interferon when a host is subjected to such ingredients. Interferon is a known antiviral substance which is involved with the inhibition of the replication of viruses in the presence of a host cell. Some of the viruses susceptible to replication inhibition by interferon are set forth in Horsfall and Tamm, "*Viral and Rickettsial Infections of Man*", 4th Edition (1965), J. B. Lippencott Company, pages 328–329.

The compounds of the present invention can be administered to animals such as warm blooded animals and particularly mammals to prevent or inhibit infections of: picornavirus, for example, encephalomyocarditis; myxovirus, for example, Influenza $A_2$ (Jap/305); arbovirus, for example, Semliki forest; Herpes virus group, for example, herpes simplex; and poxviruses, for example, Vaccinia IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The dosage administered will be dependent upon the virus for which treatment or prophylaxis is desired, the type of animal involved, its age, health, weight, extent of infection, kind of concurrent treatment, if any, frequency of treatment and the nature of the effect desired. Illustratively, a dosage of the active ingredients will generally range from less than about 0.1 to over about 500 mg (milligram) per kg (kilogram) of body weight. Illustratively, dosage levels of the administered active ingredient can be: intravenous, 0.1 to about 10 mg/kg: intraperitoneal 0.1 to about 50 mg/kg: subcutaneous, 0.1 to about 250 mg/kg: oral, 0.1 to about 500 mg/kg and preferably about 1 to about 250 mg/kg: intranasal instillation, 0.1 to about 10 mg/kg: and aerosol, 0.1 to about 10 mg/kg of animal body weight.

The novel compounds, together with conventional pharmaceutical carriers can be employed in unit dosage forms such as solids, for example, tablets or capsules or liquid solutions, suspensions or elixirs for oral administration and injections, or liquid solutions, suspensions, emulsions and the like for parenteral use. The quantity of active ingredient in each dosage will generally differ depending on the type of unit dosage, the type of animal and its weight. Thus, each dosage can contain from less than about 2.0 mg to over 3 grams of active ingredients in a significant quantity of a non-toxic pharmaceutical carrier of the type that can be taken orally, applied topically, bucally or parenterally.

The pharmaceutical carrier can, as previously indicated, be a sterile liquid such as water and oils, with or without the addition of a surfactant. Illustrative of oils there can be mentioned those of petroleum, animal, vegetable or synthetic origin, for example, peanut oil, soybean oil, mineral oil, sesame oil, and the like. In general, water, saline, aqueous dextrose, and related sugar solutions and glycols such as propylene glycol or polyethylene glycol are preferred liquid carriers, particularly for injectable solutions. Sterile injectable solutions such as saline, for example, isotonic saline, will ordinarily contain from about 0.5 to 25 percent and preferably from about 1 to 10 percent by weight of the active ingredient in the composition.

As mentioned above, oral administration can be in a suitable suspension or syrup, in which the active ingredient ordinarily will constitute from about 0.5 to 10 percent, and preferably from about 1 to 5 percent, by weight. The pharmaceutical carrier in such composition can be a watery vehicle such as an aromatic water, a syrup or a pharmaceutical mucilage; also, a suspending agent for viscosity control such as magnesium aluminum silicate, carboxymethylcellulose or the like as well as a buffer, preservative, etc.

The active ingredients can also be admixed in animal feed or incorporated into the animal's drinking water. For most purposes, an amount of active ingredient will be used to provide from about 0.0001 to 0.1 percent by weight of the active ingredient based on the total weight of feed intake. Preferably, from 0.001 to 0.02 percent by weight will be used. The selection of the particular feed is within the knowledge of the art and will depend, of course, on the animal, the economics, natural materials available, and the nature of the effect desired.

The active ingredients can be admixed in animal feed concentrates, suitable for preparation and sale to farmers or livestock growers for addition to the animal's feedstuffs in appropriate proportion. These concentrates can ordinarily comprise about 0.5 percent to about 95 percent by weight of the active ingredient compounded together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can also be used.

The feed compositions, as well as the feed concentrates, can additionally contain other components of feed concentrates or animal feeds, as will be readily understood. Other particularly important additives include proteins, carbohydrates, fats, vitamins, minerals, antibiotics, etc.

For use as aerosols the active ingredients can be packaged in a pressurized aerosol container together with a gaseous or liquefied propellant, for example, dichlorodifluoromethane, carbon dioxide, nitrogen, propane, etc. with the usual adjuvants such as co-solvents, and wetting agents, as may be necessary or desirable.

Typical surface active agents (Kirk and Othmer, *Encyclopedia of Chemical Terminology*, 1954, Vol. 13, page 513), particularly emulsifying and dispersing agents which can be used in the compositions of this invention are, for example, fatty alcohol sulfates such as sodium lauryl sulfate, aliphatic or aromatic sulfonates, such as sulfonated castor oil, and nonionic types of emulsifying or dispersing agents such as the high molecular weight alkyl polyglycol ethers, such as dodecyl polyglycol ethers containing from about 25 to 75 carbon atoms.

A desirable mode of administration for the compounds (active ingredients) of this invention is parenterally, such as by normally liquid injectable compositions, for example, for intramuscular or subcutaneous administration. In such compositions the quantity of active ingredient can vary from about 0.05 to 20 percent by weight of the composition and preferably from about 0.1 to 10 percent by weight. In order to minimize or eliminate irritation at the site of injection, the parenteral compositions can contain a non-ionic surfactant such as those having an HLB (hydrophile-lipophile balance) of about 12 to 17. Such formulations can be solutions, suspensions or emulsions in conventional liquid pharmaceutical carriers, for example, sterile liquids such as water, saline, and aqueous dextrose (glucose) and related sugar solutions. The quantity of surfactant in the formulation can vary from about 5 to 15 percent by weight of the formulation. The quantity of a compound of this invention, either in the base form or a pharmaceutically acceptable acid addition salt in such formulations, can vary over a broad range, such as that mentioned hereinbefore, that is, 0.05 to 20 percent by weight of the formulation. Preferably, the active ingredient is in the base form. The remaining component or components of such formulations can be a normally liquid pharmaceutical carrier, for example, isotonic aqueous saline, either alone or together with conventional excipients for injectable compositions. The surfactant can be a single surfactant having the above-indicated HLB or a mixture of two or more surfactants wherein such mixture has the indicated HLB. The following surfactants are illustrative of those which can be used in such formulations. (A) Polyoxyethylene derivatives of sorbitan fatty acid esters, such as the TWEEN series of surfactants, for example, TWEEN 80, and the like. The TWEENS are manufactured by Atlas Powder Company. (B) High molecular weight adducts of ethylene oxide with a hydrophobic base formed by the condensation of propylene oxide with propylene glycol, for example, PLURONIC F-68 which is manufactured by Wyandotte Chemical Company. The preferred surfactant is Polysorbate 80, U.S.P., a polyoxyethylene sorbitan monooleate.

EXAMPLES

Representative active ingredients of the present invention and their preparation are illustrated in the following examples.

EXAMPLE 1

3,6-Bis[2-(diethylamino)ethoxy]xanthen-9-one

A mixture of 23.0 g (0.1 mole) of 3,6-dihydroxyxanthen-9-one, 16.0 g (0.296 mole) of sodium methoxide, 350 ml of chlorobenzene and 60 ml of methanol was stirred and heated to 130°C. during which time methanol distilled off and was collected. After cooling the reaction mixture to less than about 100°C., 33.0 g (0.245 mole) of β-diethylaminoethyl chloride was added and the mixture refluxed for 5-½ hours then cooled to 100°C. after which 300 ml of water and 10 ml of 40% NaOH were added. For 20 minutes the mixture was stirred, then the chlorobenzene layer was separated, dried over anhydrous magnesium sulfate, filtered, treated with ethereal HCl and the resulting precipitate recrystallized from methanol-ethyl acetate to give the dihydrochloride salt of the desired product. The dihydrochloride salt was treated with dilute NaOH, extracted into chloroform, dried over anhydrous magnesium sulfate, filtered and concentrated to give a solid which was recrystallized from hexane to give the desired product. M.P. 70.5° – 72°C.

EXAMPLE 2

3,6-Bis[2-(dimethylamino)ethoxy]xanthen-9-one

To 54.5 g (0.239 mole) of 3,6-dihydroxyxanthen-9-one was added 240 ml of methanol and 29.0 g (0.717 mole) of sodium methoxide with stirring after which 700 ml of chlorobenzene was added. Methanol was distilled off until the reaction temperature reached 130°C. After cooling the reaction mixture to less than about 100°C., 64.0 g (0.590 mole) of 2-dimethylaminoethyl chloride was added and the reaction mixture refluxed for 4-½ hours followed by the addition of 600 ml of water and 20 ml of 50% NaOH with stirring continued for one-half hour. The mixture was cooled and chloroform was added to completely dissolve the product. The chlorobenzene-chloroform layer was separated and the aqueous layer was extracted into chloroform. The combined organic layers were washed with water, dried over anhydrous magnesium sulfate and evaporated to give a dark brown oil which solidified upon cooling. The solid was dissolved in boiling ethanol, precipitated with water, cooled and filtered. The resulting solid was dried in vacuo and recrystallized from hexane to give the desired product. M.P. 87.5° – 89°C.

EXAMPLE 3

3,6-Bis(2-morpholinoethoxy)xanthen-9-one

Following the procedure of Example 2, only substituting for 2-dimethylaminoethyl chloride 74.7 g (0.5 mole) of 2-morpholinoethyl chloride, the desired product was obtained after recrystallization from isopropanol. M.P. 153.5° – 154.5°C.

EXAMPLE 4

3,6-Bis(2-piperidinoethoxy)xanthen-9-one

Following the procedure of Example 2, only substituting for 2-dimethylaminoethyl chloride 74.5 g (0.5 mole) of 2-piperidinoethyl chloride, the desired product is obtained after recrystallization from methanol. M.P. 134°–134.5°C.

EXAMPLE 5

3,6-Bis[2-(diisopropylamino)ethoxy]xanthen-9-one

Following the procedure of Example 2, only substituting for 2-dimethylaminoethyl chloride the appropriate molar equivalent amount of 2-(diisopropylamino)ethyl chloride, the desired product was obtained after recrystallization from hexane. M.P. 117.5° – 118°C.

EXAMPLE 6

3,6-Bis[3-(dimethylamino)propoxy]xanthen-9-one

Following the procedure of Example 2, only substituting for 2-dimethylaminoethyl chloride the appropriate molar equivalent amount of 3-dimethylaminopropyl chloride, the desired product was obtained after recrystallization from hexane. M.P. 69°–70°C.

EXAMPLE 7

3,6-Bis[2-(diethylamino)ethylthio]xanthen-9-one dihydrochloride

A mixture of 34.0 g (0.0844 mole) of S,S'-(9-oxoxanthene-3,6-diyl)bis(dimethylthiocarbamate), 200 ml of methanol, 100 ml of 50% NaOH and 100 ml of water was refluxed under a nitrogen atmosphere until solution was complete and 700 ml of chlorobenzene was added during which time methanol and water were removed by distillation. Upon cooling 37.5 g (0.278 mole) of diethylaminoethyl chloride was added and the mixture was refluxed under a nitrogen atmosphere for 3 hours, stirred at room temperature for 49 hours then refluxed for an additional 5 hours. After cooling 300 ml of 10% NaOH was added and the mixture stirred for one-half hour after which ether and chloroform were added. The organic layer which separated was washed with water, dried over magnesium sulfate and evaporated to give a brown oil. The oily material was dissolved in 100 ml ether, treated with ethereal HCl, and the resulting precipitate was filtered and recrystallized from ethanol to give the desired product. M.P. 227°–229° C.

EXAMPLE 8

2,7-Bis[2-(dimethylamino)ethoxy]xanthene

To 20 g (0.0935 mole) of 2,7-dihydroxyxanthene in 350 ml of chlorobenzene were added 16.5 g (0.3 mole) of sodium methoxide and 60 ml of methanol. The reaction mixture was stirred and heated during which time the methanol was removed by distillation. The mixture was cooled and 29 g (0.26 mole) of 2-dimethylaminoethyl chloride was added. After refluxing with stirring for 4 hours the mixture was cooled and 100 ml of water plus 10 ml of 50% NaOH solution were added. The mixture was stirred for 15 minutes and 100 ml chloroform was added. The organic layer which separated was washed with 5% NaOH solution, then with water, dried over anhydrous magnesium sulfate, filtered and concentrated to a solid residue which was recrystallized from hexane to give the desired product. M.P. 85°–86.5°C.

EXAMPLE 9

2,7-Bis[2-(diallylamino)ethoxy]xanthene

Following the procedure of Example 8, only substituting for 2-dimethylaminoethyl chloride the appropriate molar equivalent amount of 2-diallylaminoethyl chloride, the desired product is obtained.

EXAMPLE 10

An illustrative composition for hard gelatin capsules is as follows:

|     |                                              | Per Capsule |
| --- | -------------------------------------------- | ----------- |
| (a) | 3,6-bis[2-(diethylamino)ethoxy]xanthene-9-one | 200 mg.     |
| (b) | Talc                                         | 35 mg.      |

The formulation is prepared by passing the dry powders of (a) and (b) through a fine mesh screen and mixing them well. The powder is then filled into No. 0 hard gelatin capsules at a net fill of 235 mg. per capsule.

EXAMPLE 11

An illustrative composition for tablets is as follows:

|     |                                              | Per Tablet |
| --- | -------------------------------------------- | ---------- |
| (a) | 3,6-bis[2-(diethylamino)ethoxy]xanthene-9-one | 100 mg.    |
| (b) | Wheat starch                                 | 15 mg.     |
| (c) | Lactose                                      | 33.5 mg.   |
| (d) | Magnesium stearate                           | 1.5 mg.    |

Preparation: A granulation obtained upon mixing lactose with the starch and granulated starch paste is dried, screened and mixed with the active ingredient and magnesium stearate. The mixture is compressed in tablets weighing 150 mg. each.

EXAMPLE 12

An illustrative composition for pills is as follows:

|     |                                              | Per Pill |
| --- | -------------------------------------------- | -------- |
| (a) | 3,6-bis[2-(diethylamino)ethoxy]xanthene-9-one | 100 mg.  |
| (b) | Starch, corn                                 | 90 mg.   |
| (c) | Liquid glucose                               | 10 mg.   |

The pills are prepared by blending the active ingredient and starch and then adding the liquid glucose with thorough kneading to form a plastic mass. The pills are then cut and formed from the plastic pill mass.

EXAMPLE 13

A 2% weight per volume syrup of 3,6-bis[2-(diethylamino)-ethoxy[xanthene-9-one can be prepared by the usual pharmaceutical techniques according to the following formula:

|     |                                                                     | Grams |
| --- | ------------------------------------------------------------------- | ----- |
| (a) | Finely divided 3,6-bis[2-(diethylamino)ethoxy]-xanthene-9-one       | 2.0   |
| (b) | Sucrose                                                             | 33.3  |
| (c) | Chloroform                                                          | 0.25  |
| (d) | Sodium benzoate                                                     | 0.4   |
| (e) | Methyl p-hydroxybenzoate                                            | 0.02  |
| (f) | Vanillin                                                            | 0.04  |
| (g) | Glycerol                                                            | 1.5   |
| (h) | Purified water to 100.0 ml.                                         |       |

EXAMPLE 14

3,6-bis[2-(diethylamino)ethoxy]xanthene-9-one is mixed with soybean meal to prepare an animal feed concentrate containing 10 grams of said xanthen-9-one compound per pound of the medicated feed. This can subsequently be diluted with a mixed grain ration to give a medicated feed containing 50 milligrams of the xanthen-9-one per pound of the medicated feed.

EXAMPLE 15

The following formulation is illustrative of a dusting powder:

|     |                                              | Per Kilogram |
| --- | -------------------------------------------- | ------------ |
| (a) | 3,6-bis[2-(diethylamino)ethoxy]-xanthene-9-one | 20 grams   |
| (b) | Silica aerogel                               | 980 grams    |

The dusting powder is prepared by intimately admixing the ingredients. The mixture is then packaged in dispensing containers.

EXAMPLE 16

An illustrative composition for a parenteral injection is the following aqueous emulsion.

| Each ml. contains | Ingredients                                    | Amount   |
| ----------------- | ---------------------------------------------- | -------- |
| 50 mg.            | 3,6-bis[2-(diethylamino)ethoxy]-xanthene-9-one | 1.000 g. |

| Each ml. contains | Ingredients | Amount |
|---|---|---|
| 100 mg. | Polyoxyethylene sorbitan monooleate | 2.000 g. |
| 0.0064 gm. | Sodium chloride | 0.128 g. |
| | Water for injection, q.s. | 20.000 ml. |

The composition of Example 16 is prepared by dissolving 0.64 g. of sodium chloride in 100 ml. of water for injection; mixing the polyoxyethylene sorbitan monooleate with the xanthen-9-one, adding a sufficient solution of the sodium chloride in water to the active ingredient and polyoxyethylene sorbitan monooleate to make 20 ml; shaking the mixture; and then autoclaving it for 20 minutes at 110°C. at 15 p.s.i.g. steam pressure. The composition can be dispensed in a single ampule for multiple dosage or in 10 or 20 ampules for single dosages.

Examples 17 to 28 illustrate in vivo antiviral studies with compounds, also referred to as active ingredients, of this invention. In each of the examples the compounds were antivirally active. In the examples, the compounds showed antiviral activity by prolonging the mean day of death of the treated animals as compared to the control animals, during the period of observation. The dosage levels of the compounds used in the examples were within the range of 10 to 250 mg. per kg. of animal body weight for each time the compound was administered.

Table A lists the active ingredient which was administered in each of the examples. Although it is believed that the headings in the examples are self-explanatory, some of the headings are explained as follows. The "challenge", that is, the inoculation with a virus used is generally fatal to all the untreated, that is, control animals in the experiment. "Time of death" refers to the average time of death for the untreated animals. The "Treatment" was prophylactic or therapeutic or both. The term "volume" refers to the volume of composition administered per dose which contained the active ingredient dissolved in sterile water which also contained 0.15 percent of hydroxyethylcellulose. The control animals received a sham dosage of the same volume of the vehicle which did not contain the active ingredient. The abbreviation "STR" is survival time ratio, which is calculated by dividing the mean day of death of the control animals into the mean day of death of the treated animals during the period of observation. The activity of the compound in the examples involved is further characterized, for example, low, medium, high and so forth. A survival time ratio (STR) of less than 0.90 indicates the compound was toxic; a ratio of 0.09 to 1.09 indicates that there is no activity; a ratio of 1.10 to 1.19 indicates low or weak activity; a ratio of 1.20 to 1.29 indicates medium activity; and a ratio of 1.30 and greater indicates high activity.

Table A

| Example | Compound |
|---|---|
| 17&18 | 3,6-bis[2-(diethylamino)ethoxy]xanthen-9-one. |
| 19&20 | 3,6-bis[2-(dimethylamino)ethoxy]xanthen-9-one. |
| 21&22 | 3,6-bis[2-(diethylamino)ethylthio]xanthen-9-one dihydrochloride. |
| 23 | 2,7-bis[2-(dimethylamino)ethoxy]xanthene. |
| 24 | 3,6-bis[2-(diisopropylamino)ethoxy]xanthen-9-one. |
| 25&26 | 3,6-bis[3-(dimethylamino)propoxy]xanthen-9-one. |
| 27&28 | 3,6-bis(2-piperidinoethoxy)xanthen-9-one. |

| Example No. | 17 | 18 | 19 | 20 |
|---|---|---|---|---|
| VIRUS | Encephalomyocarditis | Encephalomyocarditis | Encephalomyocarditis | Encephalomyocarditis |
| type challenge | RNA, Picornavirus | RNA, Picornavirus | RNA, Picornavirus | RNA, Picornavirus |
| challenge | 12 $LD_{50}$ | 13 $LD_{50}$ | 12 $LD_{50}$ | 12 $LD_{50}$ |
| route | Subcutaneous | Subcutaneous | Subcutaneous | Subcutaneous |
| time of death | 5.0 days | 4.8 days | 5.0 days | 5.0 days |
| period of observation | 9 days | 9 days | 9 days | 10 days |
| ANIMAL | Mice | Mice | Mice | Mice |
| weight | 15 grams | 15 grams | 15 grams | 15 grams |
| No. in treated group | 10 | 10 | 10 | 10 |
| No. in control group | 20 | 20 | 20 | 20 |
| TREATMENT | Prophylactic | Prophylactic | Prophylactic & Therapeutic | Prophylactic |
| dosage level | 250 mg/kg | 250 mg/kg | 50 mg/kg | 250 mg/kg |
| route | Subcutaneous | Oral | Subcutaneous | Oral |
| volume | 0.25 ml. | 0.25 ml. | 0.25 ml. | 0.25 ml. |
| time pre-challenge | 28,22,2 hrs. | 22 hrs. | 28,22,2 hrs. | 22 hrs. |
| post-challenge | none | none | 2 | none |
| RESULTS | | | | |
| STR | 2.06 | 1.27 | 1.62 | 2.20 |
| Activity | high | medium | high | high |

| Example No. | 21 | 22 | 23 | 24 |
|---|---|---|---|---|
| VIRUS | Encephalomyocarditis | Encephalomyocarditis | Encephalomyocarditis | Encephalomyocarditis |
| type | RNA, Picornavirus | RNA, Picornavirus | RNA, Picornavirus | RNA, Picornavirus |
| challenge | 4 $LD_{50}$ | 4 $LD_{50}$ | 10 $LD_{50}$ | 25 $LD_{50}$ |
| route | Subcutaneous | Subcutaneous | Subcutaneous | Subcutaneous |
| time of death | 5.0 days | 5.0 days | 4.5 days | 4.4 days |
| period of observation | 9 days | 9 days | 9 days | 9 days |
| ANIMAL | Mice | Mice | Mice | Mice |
| weight | 15 grams | 15 grams | 15 grams | 15 grams |
| No. in treated group | 10 | 10 | 10 | 10 |
| No. in control group | 20 | 20 | 20 | 20 |

| Example No. | 21 | 22 | 23 | 24 |
|---|---|---|---|---|
| TREATMENT | Prophylactic & Therapeutic | Prophylactic | Prophylactic | Prophylactic & Therapeutic |
| dosage level | 250 mg/kg | 250 mg/kg | 250 mg/kg | 250 mg/kg |
| route | Subcutaneous | Oral | Oral | Subcutaneous |
| volume | 0.25 ml. | 0.25 ml. | 0.25 ml. | 0.25 ml. |
| time pre-challenge | 28,22,2 hrs. | 22 hrs. | 22 hrs. | 28,22,2 hrs. |
| post-challenge | 2 hrs. | none | none | 2 hrs. |
| RESULTS | | | | |
| STR | 1.74 | 1.10 | 1.33 | 1.64 |
| Activity | high | weak | high | high |

| Example No. | 25 | 26 | 27 | 28 |
|---|---|---|---|---|
| VIRUS | Encephalo-myocarditis | Encephalo-myocarditis | Encephalo-myocarditis | Encephalo-myocarditis |
| type | RNA, Picornavirus | RNA, Picornavirus | RNA, Picornavirus | RNA, Picornavirus |
| challenge | 25 $LD_{50}$ | 25 $LD_{50}$ | 25 $LD_{50}$ | 25 $LD_{50}$ |
| route | Subcutaneous | Subcutaneous | Subcutaneous | Subcutaneous |
| time of death | 4.4 days | 4.4 days | 4.4 days | 4.4 days |
| period of observation | 9 days | 9 days | 9 days | 9 days |
| ANIMAL | Mice | Mice | Mice | Mice |
| weight | 15 grams | 15 grams | 15 grams | 15 grams |
| No. in treated group | 10 | 10 | 10 | 10 |
| No. in control group | 20 | 20 | 20 | 20 |
| TREATMENT | Prophylactic | Prophylactic | Prophylactic | Prophylactic & Therapeutic |
| dosage level | 250 mg/kg | 250 mg/kg | 250 mg/kg | 50 mg/kg |
| route | Subcutaneous | Oral | Subcutaneous | Oral |
| volume | 0.25 ml. | 0.25 ml. | 0.25 ml. | 0.25 ml. |
| time pre-challenge | 28,22 hrs. | 22 hrs. | 28,22 hrs. | 28,22,2 hrs. |
| post-challenge | none | none | none | 2 hrs. |
| RESULTS | | | | |
| STR | 2.23 | 1.23 | 1.50 | 1.20 |
| Activity | high | medium | high | medium |

We claim:

1. A method for inhibiting viral infections susceptible to replication inhibition by interferon induction which comprises administering to a host infected with a viral infection susceptible to replication inhibition by interferon, within an antivirally effective time period, an antivirally effective amount of a compound of the formula

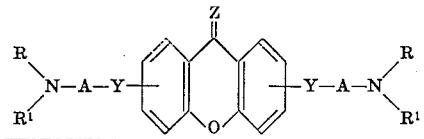

wherein Z is oxygen or $H_2$; each Y is oxygen or divalent sulfur; each A is a straight or branched alkylene chain of from two to four carbon atoms and which separates the amino nitrogen and Y by at least two carbon atoms; each R and $R^1$ is individually selected from hydrogen, lower alkyl of from one to four carbon atoms, alkenyl of from three to six carbon atoms and having the vinyl unsaturation in other than the 1-position of the alkenyl group; or each set of R and $R^1$ taken together with the nitrogen atom to which they are attached is a saturated monocyclic heterocyclic group selected from pyrrolidino, piperidino, morpholino or N-(lower)alkylpiperazino; or a pharmaceutically acceptable acid addition salt of said compound.

2. A method of claim 1 wherein the host is viable mammalian biological material apart from the intact animal.

3. A method of claim 1 wherein the host is a warm blooded animal of mammalian origin.

4. A method of claim 1 wherein the compound is 3,6-bis-[2-(diethylamino)ethoxy]xanthen-9-one or a pharmaceutically acceptable acid addition salt thereof.

5. A method of claim 1 wherein the compound is 3,6-bis-[2-(dimethylamino)ethoxy] xanthen-9-one or a pharmaceutically acceptable acid addition salt thereof.

6. A method of claim 1 wherein the compound is 3,6-bis-[3-(dimethylamino)propoxy]xanthen-9-one or a pharmaceutically acceptable acid addition salt thereof.

7. A method of claim 1 wherein the compound is administered in an amount of from about 0.1 to about 500 milligrams per kilogram of host body weight.

* * * * *